US008533482B2

(12) United States Patent
Sun et al.

(10) Patent No.: US 8,533,482 B2
(45) Date of Patent: Sep. 10, 2013

(54) METHOD FOR GENERATING A KEY PAIR AND TRANSMITTING A PUBLIC KEY OR REQUEST FILE OF A CERTIFICATE IN SECURITY

(75) Inventors: Jiping Sun, Beijing (CN); Yong Han, Beijing (CN)

(73) Assignee: Beijing Senselock Software Technology Co., Ltd., Beijing (CN)

( * ) Notice: Subject to any disclaimer, the term of this patent is extended or adjusted under 35 U.S.C. 154(b) by 358 days.

(21) Appl. No.: 12/745,590

(22) PCT Filed: Nov. 28, 2008

(86) PCT No.: PCT/CN2008/001942
§ 371 (c)(1),
(2), (4) Date: Jun. 1, 2010

(87) PCT Pub. No.: WO2009/079916
PCT Pub. Date: Jul. 2, 2009

(65) Prior Publication Data
US 2010/0310077 A1    Dec. 9, 2010

(30) Foreign Application Priority Data
Dec. 3, 2007  (CN) .......................... 2007 1 0178658

(51) Int. Cl.
*H04L 9/32*    (2006.01)
(52) U.S. Cl.
USPC ............................................ 713/180; 726/10
(58) Field of Classification Search
USPC ................. 726/14, 10; 713/171, 14, 180
See application file for complete search history.

(56) References Cited

U.S. PATENT DOCUMENTS

| 7,287,164 | B2 | 10/2007 | Carro |
| 7,500,272 | B2 * | 3/2009 | Wheeler et al. ............... 713/171 |
| 2002/0023217 | A1 | 2/2002 | Wheeler et al. |
| 2007/0116269 | A1 * | 5/2007 | Nochta ........................... 380/30 |

(Continued)

FOREIGN PATENT DOCUMENTS

| CN | 1534936 | * 10/2004 |
| CN | 1534936 A | 10/2004 |

(Continued)

OTHER PUBLICATIONS

International Search Report corresponding to PCT/CN2008/001942, mailed on Mar. 5, 2009.

*Primary Examiner* — Christopher Brown
(74) *Attorney, Agent, or Firm* — Renner, Otto, Boisselle & Sklar, LLP

(57) ABSTRACT

A method for generating a key pair and transmitting a public key or request file of a certificate in security is provided. Usually, when a user applies for a certificate, a public-private key pair is always generated by a client side; the public key is combined with the user information to form the certificate; the CA's signature enables validity of user's certificate. However, in other cases, the client side is not a perfectly secure environment, so the private key of the user generated from the client side may be filched by a hacker, or may be replaced by a forged public key. On this occasion, the hacker can disguise the user without being detected. The method of the present invention is to use an information security device to generate a public-private key pair, the private key is saved within the information security device; the public key can be exported; and the information security device can generate authentication information for verifying the public key. The CA can determine whether the public key is generated by the information security device or not by verifying the authentication information. By the method provided by the present invention, the security of online transactions can be ensured effectively.

7 Claims, 4 Drawing Sheets

(56) References Cited

U.S. PATENT DOCUMENTS

| | | | |
|---|---|---|---|
| 2008/0095368 A1* | 4/2008 | Iida et al. | 380/259 |
| 2009/0012900 A1* | 1/2009 | Morin et al. | 705/64 |
| 2009/0318114 A1* | 12/2009 | Bertoni | 455/410 |
| 2011/0093938 A1* | 4/2011 | Asokan et al. | 726/7 |

FOREIGN PATENT DOCUMENTS

| | | | |
|---|---|---|---|
| CN | 1633068 A | | 6/2005 |
| CN | 1801029 | * | 7/2006 |
| CN | 1801029 A | | 7/2006 |
| CN | 101170407 A | | 4/2008 |

\* cited by examiner

METHOD FOR GENERATING A KEY PAIR AND TRANSMITTING A PUBLIC KEY OR REQUEST FILE OF A CERTIFICATE IN SECURITY

FIELD OF THE INVENTION

The present invention relates to the field of information security, and more particularly, to a method for generating a key pair and transmitting a public key or request file of a certificate in security.

BACKGROUND OF THE INVENTION

A private key refers to a private key of a user in a Public Key Infrastructure (PKI) system.

A public key refers to a public key of a user in the PKI system.

A CA refers to an entity that issues certification authority in the PKI system. Request file of a certificate refers to a collection of information submitted to the CA by a user during the request for certificate.

A self-signature refers to a signature to request file of a certificate by using a private key of a user in the request file of a certificate submitted to the CA.

With the spread of informationization and digitalization, the key security receives more and more attentions from people. Online banking service, interne games, payment platforms, online stock exchanges and the like are all based on the security of private keys; in other words, the security of all online transactions of users relies on the private keys they keep. Therefore, the security of the private keys is extremely critical for online tradeoff, and in effect, the private key protection needs to start on generating correlative a key pair and transmitting the public key information or request file of a certificate over the network.

With current technologies, a key pair (a public key and a private key) is generated while a user is applying for certificate. This procedure is as follows: generating a public-private key pair from a client side; then, generating request file of a certificate according to the generated public key and information of the user; signing the generated request file of a certificate using the private key generated by the client side; and finally, transmitting the signed request file of a certificate to a CA through the network to be authenticated by the CA to become a certificate. However, as the client side is not a perfectly secured environment, hackers may filch the private key of the user through a Trojan program, or replace the public key of the user and the self-signature of the request file of a certificate by intercepting the request file of a certificate sent by the user, and seek profits using the private key before being detected by the user.

To sum up, there exist security vulnerabilities during the request for certificate in the prior art, a major problem of which is that the security of the environment of generating the key pair and the public key information or the request file of a certificate in the network transmission cannot be guaranteed.

SUMMARY OF THE INVENTION

An object of the present invention is to provide a method for generating a key pair and transmitting public key information or request file of a certificate in security, thereby to overcome the insecurity that exists during the generation of the key pair and during the network transmission of public key information or the request file of a certificate in the prior art.

In order to achieve the aforesaid object, this invention provides a method for generating a key pair and transmitting public key information in security, which comprises the following steps:

(1) Storing a key A in an information security device, wherein the key A cannot be exported;

(2) Generating a key pair which comprises a private key C and a public key D by using the information security device, wherein the private key C is stored and cannot be exported;

(3) Generating authentication information M for verifying the public key D generated by the information security device using the key A;

(4) Exporting the public key D and the authentication information M from the information security device;

(5) Transmitting the authentication information M and the public key D together to a receiver; and (6) Verifying the public key D and the authentication information M by the receiver.

In order to achieve the aforesaid objective, the invention provides a method for generating a key pair and transmitting request file of a certificate in security, which comprises the following steps:

(1) Storing a key in an information security device;

(2) Generating a key pair which comprises a private key C and a public key D by using the information security device, wherein the private key C is stored in the information security device and cannot be exported;

(3) Generating authentication information M for the public key D generated by the information security device using the key;

(4) Exporting the public key D after Step (3) is executed from the information security device;

(5) Combining the exported public key D with user information to generate request file of a certificate;

(6) Signing the request file of a certificate by the information security device using the private key C;

(7) Appending the authentication information M to the request file of a certificate after Step (6) has been executed and transmitting the authentication information M along with the request file of a certificate after Step (6) has been executed to a CA;

(8) The CA verifying the request file of a certificate and the authentication information.

With the method of this invention, the security of generating a key pair and transmitting public key information or request file of a certificate can be ensured effectively, thereby to ensure the security of online transactions.

DETAILED DESCRIPTION OF THE INVENTION

Figure 1:
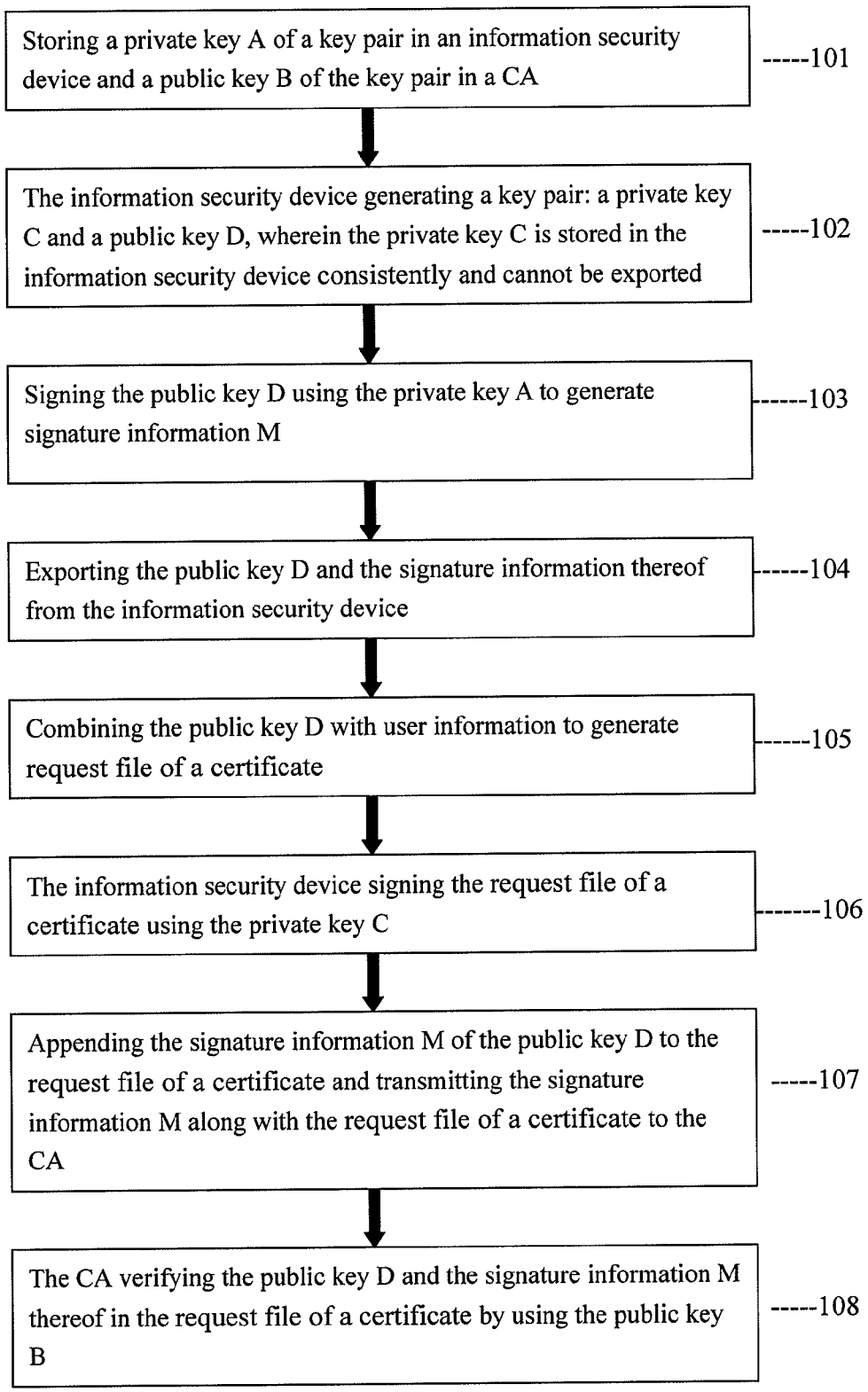
FIG. 1 is a flowchart of a method for generating a key pair and transmitting request file of a certificate in security according to a first embodiment of the present invention.

The core concepts and design principles of the invention are as follows:

In order to ensure the security of a private key, a public-private key pair is generated in an information security device, and the private key is stored in the information security device and cannot be exported so that a Trojan program cannot filch the private key. Then, request file of a certificate is generated by a client side according to a public key exported from the information security device and user information, and the information security device signs the generated request file of a certificate using the private key generated by itself and transmits the signed request file of a certificate to a CA;

In order to ensure the security of the request file of a certificate during transmission, and more particularly, in order to ensure that the public key and a self-signature of the request file of a certificate are not replaced, the information security device needs to generate authentication information for the public key generated by itself. The client appends the authentication information to the request file of a certificate and transmits the authentication information along with the request file of a certificate to the CA. By verifying the authentication information, the CA determines whether the public key is generated in the information security device, i.e., whether the public key and the self-signature in the request file of a certificate have not been replaced.

The aforesaid authentication information can be generated by symmetric algorithms, asymmetric algorithms, HAMC or unopened algorithms specified by the CA.

If the authentication information is generated by the asymmetric algorithms, a private key needs to be stored in the information security device beforehand. The information security device digitally signs the public key generated by it using the private key stored beforehand as the authentication information. The private key stored beforehand can neither be exported nor be used for other purposes but can only be used to generate the authentication information for the public key generated by the information security device.

If the authentication information is generated by symmetric algorithms or HAMC, a key needs to be shared between the CA and the information security device. The information security device uses the shared key to calculate, for the public key generated by it, a message authentication code as the authentication information. Of course, the shared key cannot be used for other use either.

As attackers cannot forge the authentication information generated by the information security device, they cannot replace the public key and the self-signature in the request file of a certificate and cannot defraud the CA without being detected.

After a public-private key pair is generated outside the information security device, in order to prevent the public key from being replaced by Trojan program which imports forged public key into the information security device and then exports that make the information security device use the public key generated by the Trojan program to generate authentication information, the following two means can be used to solve this problem: a first means is that the public key is not allowed to be imported into the information security device; and a second means is that the authentication information of the public key and the public-private key pair are generated simultaneously and stored in the information security device, and can be exported when necessary. In addition, the information certainly cannot be altered at all.

For understanding the objective, technical solutions and features of the present invention more clearly, the invention will now be described in detail with reference to the attached drawings and embodiments thereof.

Embodiment 1:

Referring to FIG. 1, there is a flowchart describing a method for generating a key pair and transmitting request file of a certificate in security according to a first embodiment of the present invention. The method comprises the following steps:

Step 101: Storing a private key A of a key pair in an information security device and a public key B of the key pair in a CA.

The private key A here can neither be exported nor be used for other purposes except for what is described in the present invention.

Step 102: The information security device generating a key pair: a private key C and a public key D, wherein the private key C is stored in the information security device consistently and cannot be exported.

Step 103: Signing the public key D using the private key A to generate signature information M.

In order to prevent the information security device from generating authentication information by using a public key forged by the Trojan program, Step 102 and Step 103 should be executed simultaneously so that the signature information M of the public key D is generated at the same time when the public key D and the private key C are generated, or it should be ensured that no public key is imported into the information security device from outside.

Step 104: Exporting the public key D and the signature information M thereof from the information security device.

Step 105: Combining the public key D with user information to generate request file of a certificate.

Step 106: the information security device signing the request file of a certificate by using the private key C.

Step 107: Appending the signature information M of the public key D to the request file of a certificate after Step 106 has been executed, and transmitting the signature information M along with the request file of a certificate after Step 106 has been executed to the CA.

The aforesaid steps are intended to ensure the security of the request file of a certificate during transmission, and more specifically, to ensure that the public key and a self-signature of the request file of a certificate are not replaced.

Step 108: The CA verifying the public key D and the signature information M thereof in the request file of a certificate by using the public key B.

If the public key D and the signature information M thereof pass the verification successfully, then it means that the public key D is generated in the information security device and that the public key D and the self-signature information in the request file of a certificate are not replaced, so the CA can sign the request file of a certificate to make it become a certificate; otherwise, then it means that the public key D in the request file of a certificate is not generated in the information security device or has been replaced during transmission, so the CA will not sign the request file of a certificate to make it become a certificate.

Figure 2:
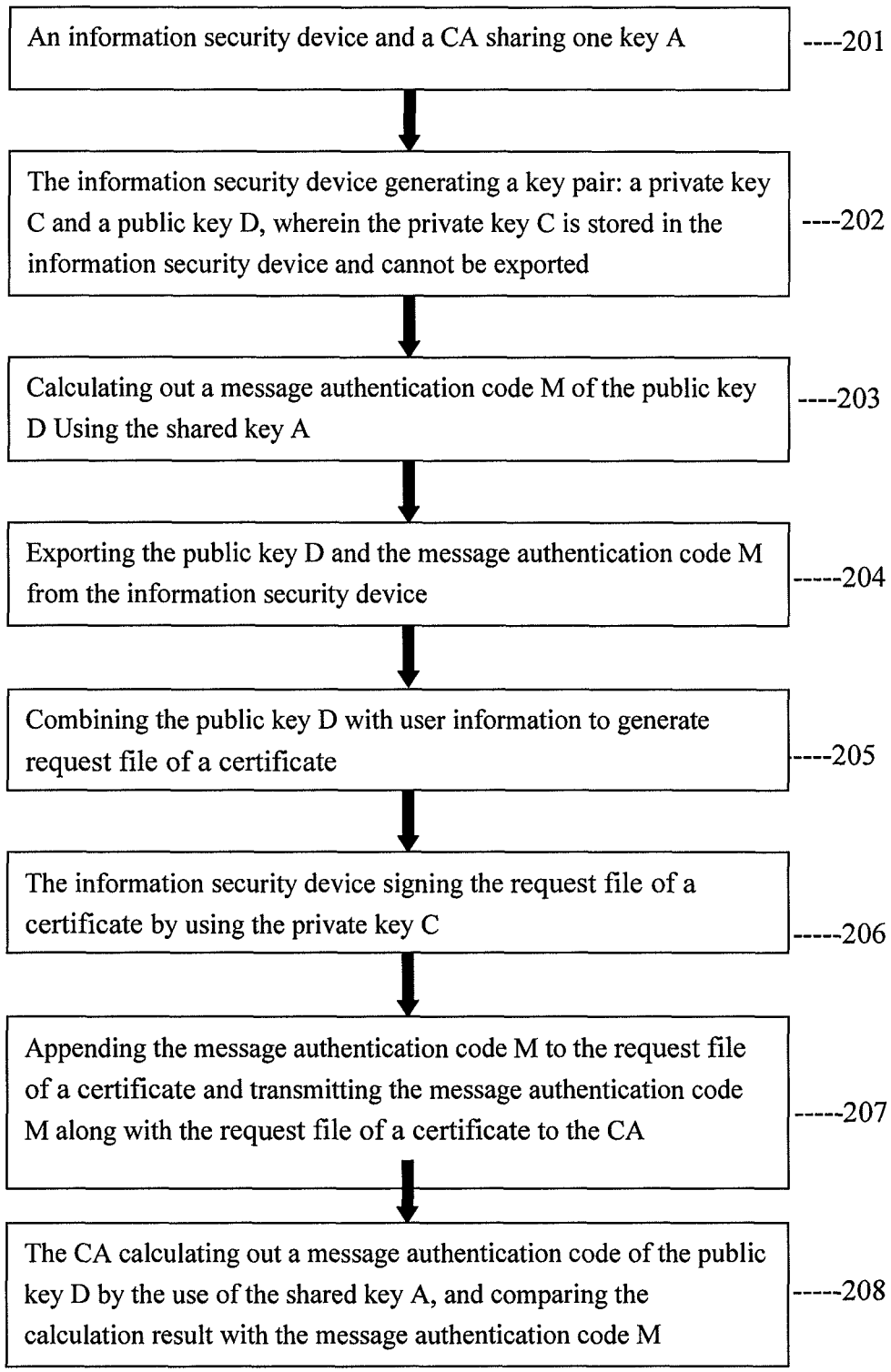
FIG. 2 is a flowchart of a method for generating a key pair and transmitting request file of a certificate in security according to a second embodiment of the present invention.

Embodiment 2:

Referring to FIG. 2, there is a flowchart describing a method for generating a key pair and transmitting request file of a certificate in security according to a second embodiment of the present invention. The method comprises the following steps:

Step 201: An information security device and a CA sharing one key A.

The key A here can neither be exported nor be used for other purposes expect for what is described in the present invention.

Step 202: The information security device generating a key pair: a private key C and a public key D, wherein the private key C is stored in the information security device consistently and cannot be exported.

Step 203: Calculating out a message authentication code M of the public key D using the shared key A.

In order to prevent the information security device from generating authentication information using a public key generated by the Trojan program, Step 202 and Step 203 should be executed simultaneously so that the message authentication code M of the public key D is generated at the same time when the public key D and the private key C are generated, or it should be ensured that no public key is imported into the information security device from outside. The message authentication code M stands for MAC (Message Authentication Code).

Step 204: Exporting the public key D and the message authentication code M from the information security device.

Step 205: Combining the public key D with user information to generate request file of a certificate.

Step 206: The information security device signing the request file of a certificate by using the private key C.

Step 207: Appending the message authentication code M to the request file of a certificate after Step 206 has been executed, and transmitting the message authentication code M along with the request file of a certificate to the CA after Step 206 has been executed.

The aforesaid steps are intended to ensure the security of the request file of a certificate during transmission, and more specifically, to ensure that the public key and a self-signature of the request file of a certificate are not replaced.

Step 208: The CA calculating out a message authentication code of the public key D by the use of the shared key A, and comparing the calculation result with the message authentication code M.

If the two message authentication codes are identical, then it means that the public key D is generated in the information security device and that the public key D and the self-signature information in the request file of a certificate are not replaced, so the CA can sign the request file of a certificate to make it become a certificate; otherwise, then it means that the public key D in the request file of a certificate is not generated in the information security device or has been replaced during transmission, so the CA will not sign the request file of a certificate to make it become a certificate.

Figure 3:
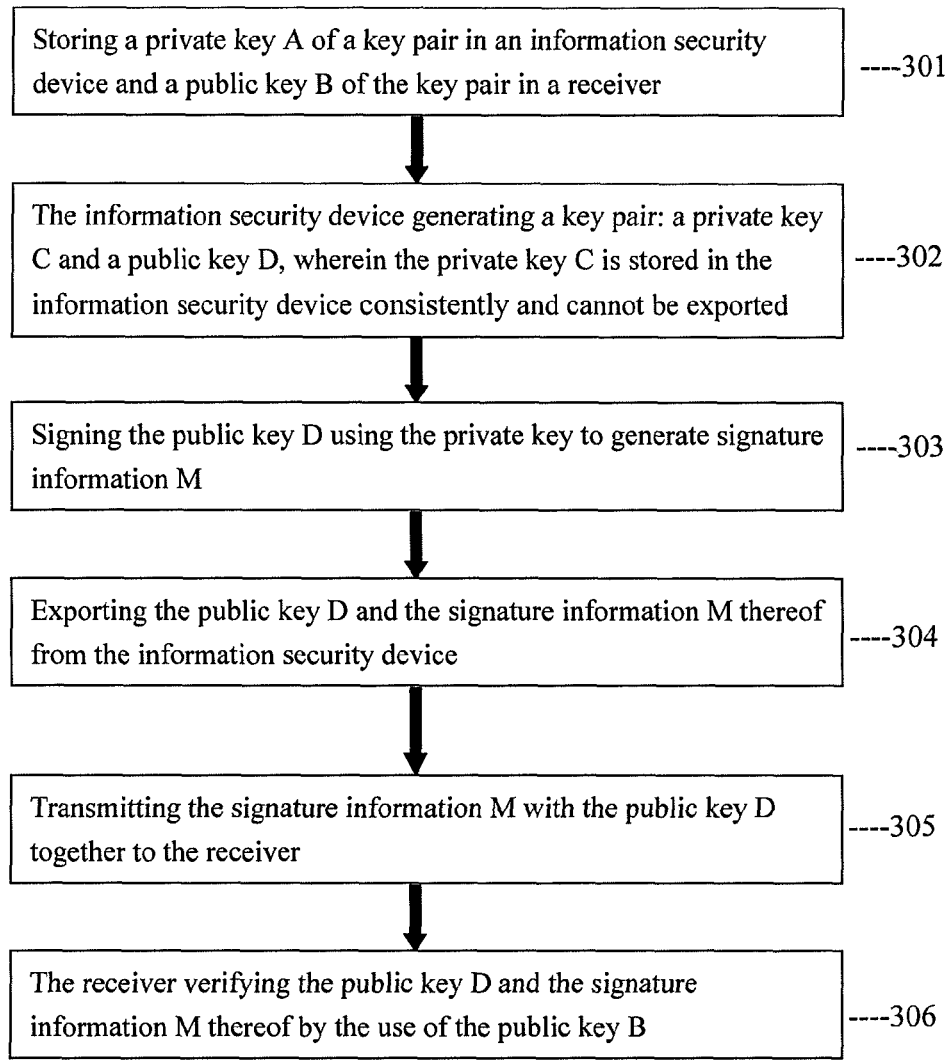
FIG. 3 is a flowchart of a method for generating a key pair and transmitting public key in security according to a third embodiment of the present invention.

Embodiment 3:

Referring to FIG. 3, there is a flowchart describing a method for generating a key pair and transmitting public key information in security according to a third embodiment of the present invention. The method comprises the following steps:

Step 301: Storing a private key A of a key pair in an information security device and a public key B of the key pair in a receiver.

The private key A here can neither be exported nor be used for other purposes except for what is described in the present invention. The receiver can be any entity of verifying a public key and authenticating the information.

Step 302: The information security device generating a key pair: a private key C and a public key D, wherein the private key C is stored in the information security device consistently and cannot be exported.

Step 303: Signing the public key D using the private key A to generate signature information M.

In order to prevent the information security device from generating authentication information using a public key generated by the Trojan program, Step 302 and Step 303 should be executed simultaneously so that the signature information M of the public key D is generated at the same time when the public key D and the private key C are generated, or it should be ensured that no public key is imported into the information security device from outside.

Step 304: Exporting the public key D and the signature information M thereof from the information security device.

Step 305: Transmitting the signature information M with the public key D to the receiver.

The aforesaid steps are intended to ensure the security of the public key information during transmission, and more specifically, to ensure that the public key information is not replaced.

Step 306: The receiver verifying the public key D and the signature information M thereof by the use of the public key B.

If the public key D and the signature information M thereof pass the verification successfully, then it means that the public key D is generated in the information security device and is not replaced during transmission; otherwise, then it means that the public key D is not generated in the information security device or has been replaced during transmission.

Figure 4:
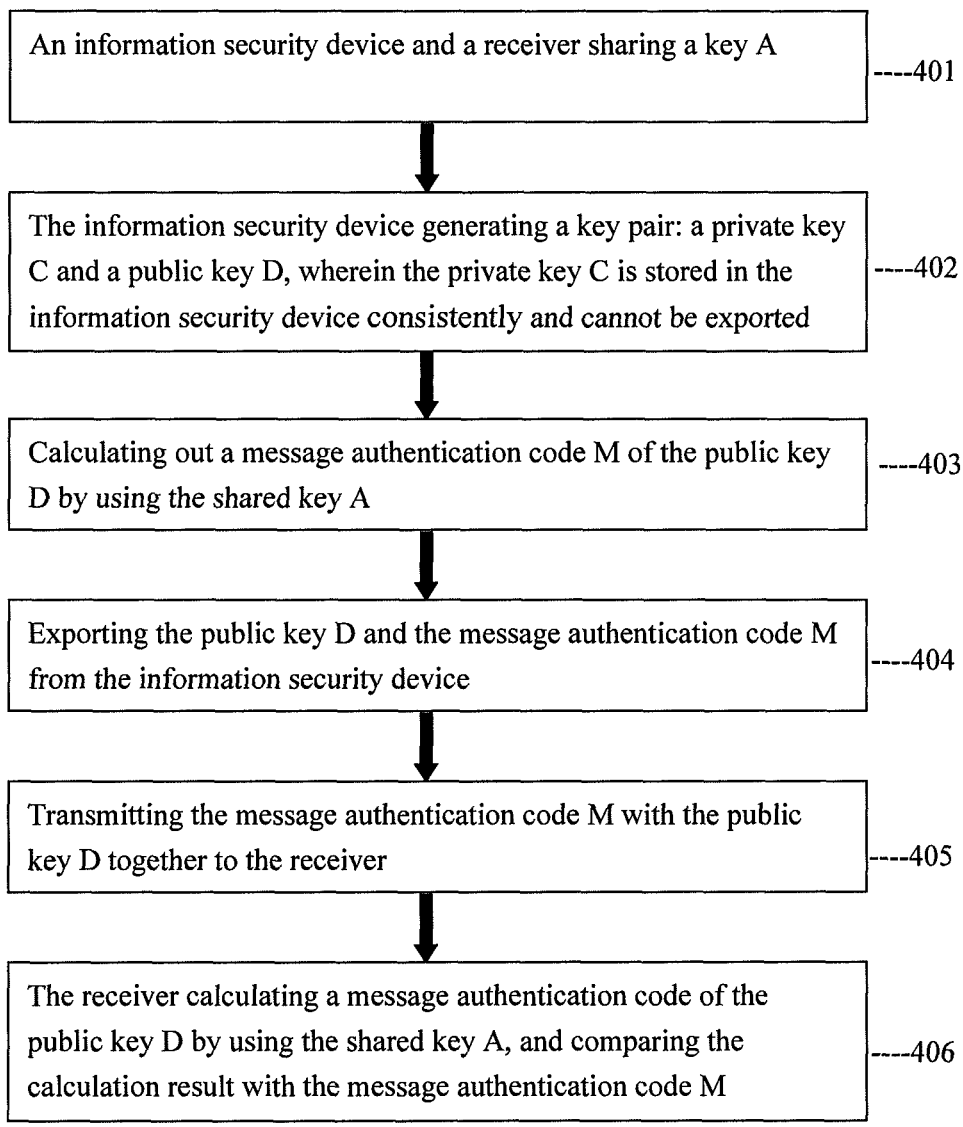
FIG. 4 is a flowchart of a method for generating a key pair and transmitting public key in security according to a fourth embodiment of the present invention.

Embodiment 4:

Referring to FIG. 4, there is a flowchart describing a method for generating a key pair and transmitting public key information in security according to a fourth embodiment of the present invention. The method comprises the following steps:

Step 401: An information security device and a receiver sharing a key A.

The key A here can neither be exported nor be used for other purposes except for what is described in the present invention. The receiver may be any entity of verifying a public key and authenticating the information.

Step 402: The information security device generating a key pair: a private key C and a public key D, wherein the private key C is stored in the information security device consistently and cannot be exported.

Step 403: Calculating out a message authentication code M of the public key D by using the shared key A.

In order to prevent the information security device from generating authentication information using a public key forged by the Trojan program, Step 402 and Step 403 should be executed simultaneously so that the message authentication code M of the public key D is generated at the same time when the public key D and the private key C are generated, or it should be ensured that no public key is imported into the information security device from outside. The message authentication code M stands for MAC (Message Authentication Code).

Step 404: Exporting the public key D and the message authentication code M from the information security device.

Step 405: Transmitting the message authentication code M with the public key D to the receiver.

The aforesaid steps are intended to ensure the security of the public key information during transmission, and more particularly, to ensure that the public key is not replaced.

Step 406: The receiver calculating out a message authentication code of the public key D by using the shared key A, and comparing the calculation result with the message authentication code M.

If the two message authentication codes are identical, then it means that the public key D is generated in the information security device and is not replaced during transmission; otherwise, then it means that the public key D is not generated in the information security device or has been replaced during transmission.

Obviously, a variety of modifications may be made by skilled technician in the cryptography on methods defined by the present invention without departing from spirits of the present invention. Accordingly, such modifications made within the scope of the claims and equivalents thereof of the present invention shall also be covered by the present invention.

The invention claimed is:

1. A method for generating a key pair and transmitting a request file to request a certificate, comprising the following steps:
   (1) Storing a key A in an information security device, wherein the key A cannot be exported;
   (2) Generating a key pair which comprise a private key C and a public key D using the information security device, wherein the private key C is stored in the information security device and cannot be exported;
   (3) Generating authentication information M for the public key D generated by the information security device using the key A by: signing the public key D using the private key A to generate signature information M or by calculating out a message authentication code M of the public key D using the shared key A;
   (4) Exporting the public key D and the authentication information M from the information security device;
   (5) Combining the exported public key D with user information to generate request file of a certificate;
   (6) The information security device signing the request file of a certificate using the private key C;
   (7) Appending the authentication information M to the request file of a certificate signed by the private key C and transmitting the authentication information M along with the request file of a certificate to a CA;
   (8) The CA verifying the request file of a certificate and the authentication information M.

2. The method for generating a key pair and transmitting request file of a certificate in security according to claim 1, characterized in that:
   Generating the key pair and generating authentication information M are executed such that the authentication information M of the public key D is generated when the public key D and the private key C are generated.

3. The method for generating a key pair and transmitting request file of a certificate in security according to claim 1, characterized in that:
   The information security device does not allow a public key to be imported from outside.

4. The method for generating a key pair and transmitting request file of a certificate in security according to claim 1, characterized in that:
   The key stored in the information security device is a private key A of a key pair, and the CA stores a public key B of the key pair;
   Generating authentication information M for the public key D generated by the information security device using the key A is accomplished by: signing the public key D using the private key A to generate signature information M;
   In the step of the CA verifying the request file of a certificate and the authentication information M, the CA verifies the public key D and the signature information M thereof in the request file of a certificate by using the public key B.

5. The method for generating a key pair and transmitting request file of a certificate in security according to claim 4, characterized in that:
   The signature information M is a digital signature generated by asymmetric algorithms.

6. The method for generating a key pair and transmitting request file of a certificate in security according to claim 1, characterized in that:
   The information security device and the CA share the key A;
   Generating authentication information M for the public key D generated by the information security device using the key A is accomplished by: calculating out a message authentication code M of the public key D using the shared key A;
   In the step of the CA verifying the request file of a certificate and the authentication information M, the CA calculates out the message authentication code M of the public key D uses the shared key A, and verifies by comparing the calculation result with the message authentication code M.

7. The method for generating a key pair and transmitting request file of a certificate in security according to claim 6, characterized in that:
   The message authentication code M is calculated by symmetric algorithms or HMAC.

* * * * *

UNITED STATES PATENT AND TRADEMARK OFFICE
CERTIFICATE OF CORRECTION

PATENT NO. : 8,533,482 B2  
APPLICATION NO. : 12/745590  
DATED : September 10, 2013  
INVENTOR(S) : Sun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this
Fifteenth Day of September, 2015

Michelle K. Lee
*Director of the United States Patent and Trademark Office*